(12) United States Patent
Meyer

(10) Patent No.: US 6,179,103 B1
(45) Date of Patent: Jan. 30, 2001

(54) LICENSE PLATE BRACKET WITH ELECTRICAL ATTACHMENT

(76) Inventor: David Micheal Meyer, 826 S. 7th St., Breckenridge, MN (US) 56520

( * ) Notice: Under 35 U.S.C. 154(b), the term of this patent shall be extended for 0 days.

(21) Appl. No.: 09/159,033

(22) Filed: Sep. 23, 1998

(51) Int. Cl.[7] .................................................. H02G 11/00
(52) U.S. Cl. ........................................ 191/12 R; 191/12.4
(58) Field of Search ............................ 191/12 R, 12.2 R, 191/12.4

(56) References Cited

U.S. PATENT DOCUMENTS

| | | | |
|---|---|---|---|
| 4,160,576 | 7/1979 | Vettori | 339/119 |
| 4,479,693 | 10/1984 | Uyeda et al. | 339/119 |
| 4,613,728 | 9/1986 | Lathrop | 174/53 |
| 5,056,698 | 10/1991 | Kozakevich | 224/273 |
| 5,177,889 | 1/1993 | Ching Hwei | 40/204 |
| 5,255,166 | 10/1993 | Gonzalez | 362/83.2 |
| 5,255,767 | 10/1993 | Norwood | 191/12.2 |
| 5,288,094 | 2/1994 | Putnam | 280/420 |
| 5,669,471 | * 9/1997 | Unze | 191/12.2 R |

\* cited by examiner

*Primary Examiner*—S. Joseph Morano
*Assistant Examiner*—Robert J. McCarry, Jr.
(74) *Attorney, Agent, or Firm*—Curtis Harr

(57) ABSTRACT

A new and improved apparatus for connecting electrical extension cords and trailer electrical connectors to a fixed point on a vehicle. The apparatus consists of a bracket which is secured onto a vehicle bumper through tabs aligned over vehicle license plate attachment holes. A vehicle electrical connector lead wire is routed through a notch in the bracket wherein it resides in a wire channel molded to the rear bracket. The notch on a vehicle electrical connector or a vehicle electrical trailer connector allows permanent fixation of either within an electrical connector housing molded to the front of the bracket. A connector cover is attached to the device housing to help prevent accidental shock and to protect the electrical connector from exposure and damage when the vehicle electrical attachment is not in use. The cover is easily moved during use through a compression spring and remains attached to the device housing preventing loss or damage. The preferred method of utilizing the apparatus allows the user to single-handedly connect or disconnect an external electrical attachment to the permanently fixated electrical attachment point upon the vehicle.

13 Claims, 6 Drawing Sheets

LICENSE PLATE BRACKET WITH ELECTRICAL ATTACHMENT

BACKGROUND OF THE INVENTION

The present invention relates to an improvement in the method of connection of the electrical extension cords and trailer light connections to vehicles today. More specifically, to a method of making such connections to a point which is fixed on an existing component of the vehicle.

In the northern areas of the United States and most all areas of Canada many vehicles use engine and battery heaters and on board charging systems employed to make the engines of these vehicles easier to start during cold weather. Most of these accessories use 110–120 volt alternating currents for power. These accessories usually have a cord with a male connector that must be routed from the accessory to somewhere on the front end of the vehicle, which usually entails routing the cord through the grill, front bumper or under the hood.

There are numerous problems associated with these routing systems. Routing the cord out through the front grill is often difficult because there is very little room to get the cord end out of the existing grill openings. The amount of space is even so limited in some circumstances that the cord end must be cut off and a new one reinstalled after the endless cord is fed through the grill. Placing the cord end under the hood of the vehicle imposes the problem of having to open and close the hood each time the accessory is plugged in. An alternative variation on this approach is to leave a portion of the end of the cord hanging beneath the hood and in front of the grill. The problems that this creates are that it is not only unsightly, but also leaves the plug end free to move around in the wind and damage the grill or the painted surface of the vehicle. Further, ice and water may collect on the exposed male plug end and cause damage to the plug.

Another approach to mount the cord to an accessible part of the vehicle is to attach it somewhere on the lower surface of the front bumper. The problem with this is that it is very often difficult and cumbersome to reach the cord end to plug it in. This situation is worsened when there is snow and ice on the surface upon which the vehicle is parked (hardly a rare occurrence in the northern portion of North America during the winter months). Another common approach is to place the cord end at the rear of the hood near the windshield of the vehicle. The problem with this is that the area immediately behind the hood often fills with snow and ice making it difficult to effectuate the connection between the cord end and an extension cord. Lastly, a problem associated with all these methods of cord attachment is that they all require the use of both of the user's hands to make the connection.

A similar problem exists at the rear of the vehicle. Many vehicles use trailers to transport items that are too heavy or bulky to be moved by the vehicle itself. These trailers are required by law to be fitted with lighting systems and are also often equipped with electrical braking systems. The trailer wiring harness for these systems usually ends at the front of the trailer tongue near the hitch. The end of the wiring harness is equipped with a connector that is plugged into a corresponding connector that is wired into the vehicle's electrical lighting system. In many instances, the connector located on the vehicle is left to hang loose out beneath the rear bumper, through a hole in the bumper or any other number of unsuitable locations that are not conducive to the nature of the connection being sought by the user. In this type of connector installation the connector can also be damaged by excessive movement and exposure to road wear and adverse weather conditions. Finally, this also requires the use of both of the user's hands to make the connection between the trailer and the towing vehicle, as the user must grasp each end in a hand.

Prior art shows at least two devices, such as the Norwood U.S. Pat. No. 5,255,767 and the Kozakevich U.S. Pat. No. 5,056,698, that are made to mount behind a license plate in order to store an electrical cord to deal with many of the foregoing problems. These devices can be rather bulky and detract from the visual appeal of a vehicle. Further, the devices may be cumbersome to use as the operator must unwrap and wrap a cord after each use, thus, defeating the purpose of increasing the aesthetic appeal and convenience of attaching an electrical accessory on a vehicle.

SUMMARY OF THE INVENTION

It is the primary objective of the present invention to provide a new and improved method for connecting electrical extension cords and trailer electrical connectors to a fixed point on a vehicle.

It is an additional objective of the present invention to provide a method for conveniently locating vehicle electrical connection systems which can be protected against exposure to the elements and damage to electrical connectors while further protecting the user from shock due to damaged connectors.

It is still a further objective of the present invention to provide a method for single-handedly attaching and removing a vehicle electrical connection system from an external electrical connector through a simple series of steps.

These objectives are accomplished by the use of an improved design in license plate brackets with electrical attachments. The apparatus consists of a bracket which is secured onto a vehicle bumper through tabs aligned over vehicle license plate attachment holes. A vehicle electrical connector lead wire is routed through a notch in the bracket where it resides in a wire channel molded to the rear bracket. The notch on a vehicle's accessory cord, electrical connector or a vehicle's electrical trailer connector and allows permanent fixation of either within an electrical connector housing molded to the front of the bracket. A connector cover is attached to the device housing to help prevent accidental shock and to protect the electrical connector from exposure and damage when the vehicle electrical attachment is not in use. The cover is easily swivelled during use through a compression spring and remains attached to the device housing preventing loss or damage to it. The preferred method of utilizing the apparatus allows the user to single-handedly connect or disconnect an external electrical attachment to the permanently fixated electrical attachment point upon the vehicle.

For a better understanding of the present invention reference should be made to the drawings and the description in which there are illustrated and described preferred embodiments of the present invention.

DESCRIPTION OF THE PREFERRED EMBODIMENT

Figure 1:
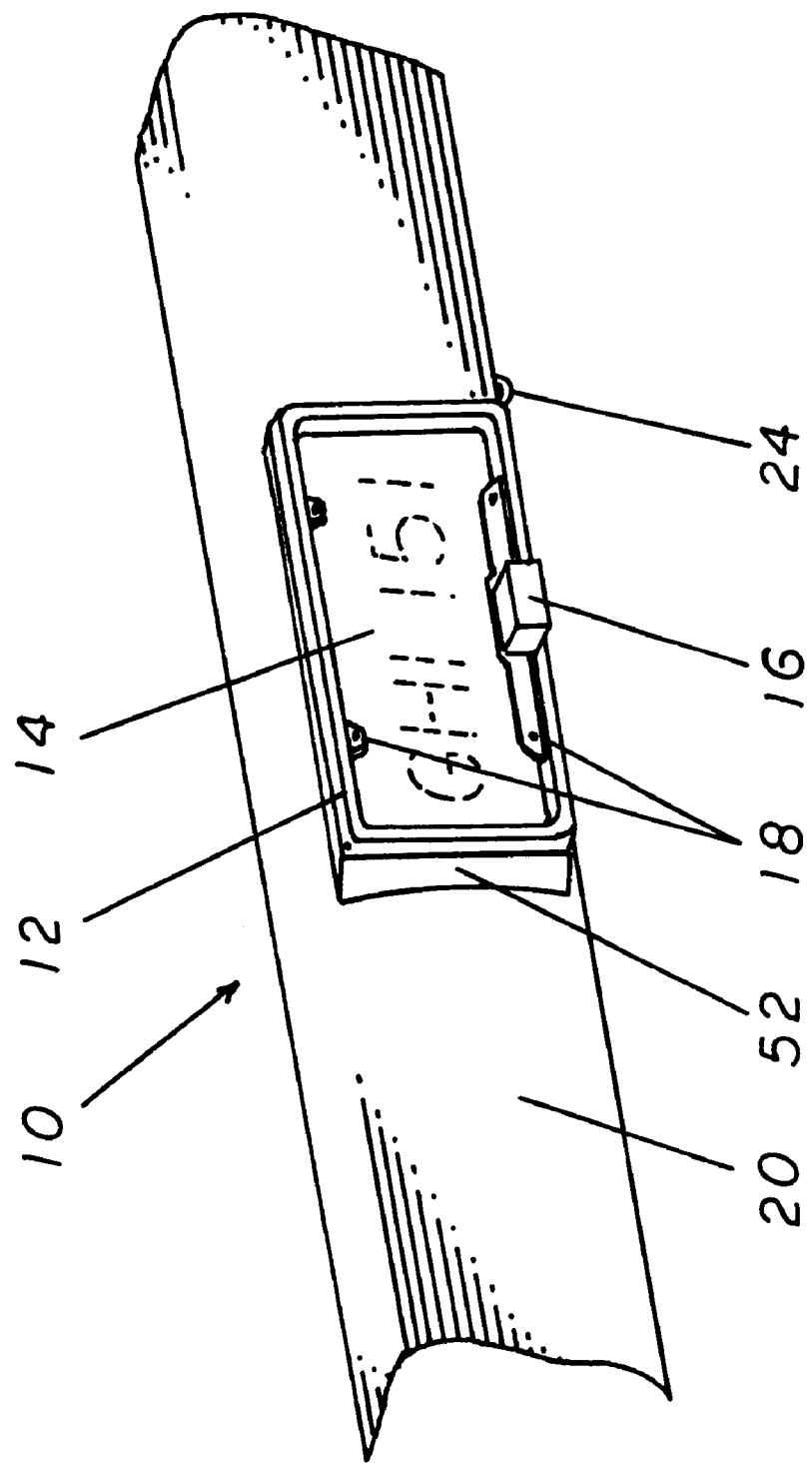
FIG. 1 is a perspective view of the present invention showing the manner in which it is mounted to the bumper of a vehicle.
Figure 2:
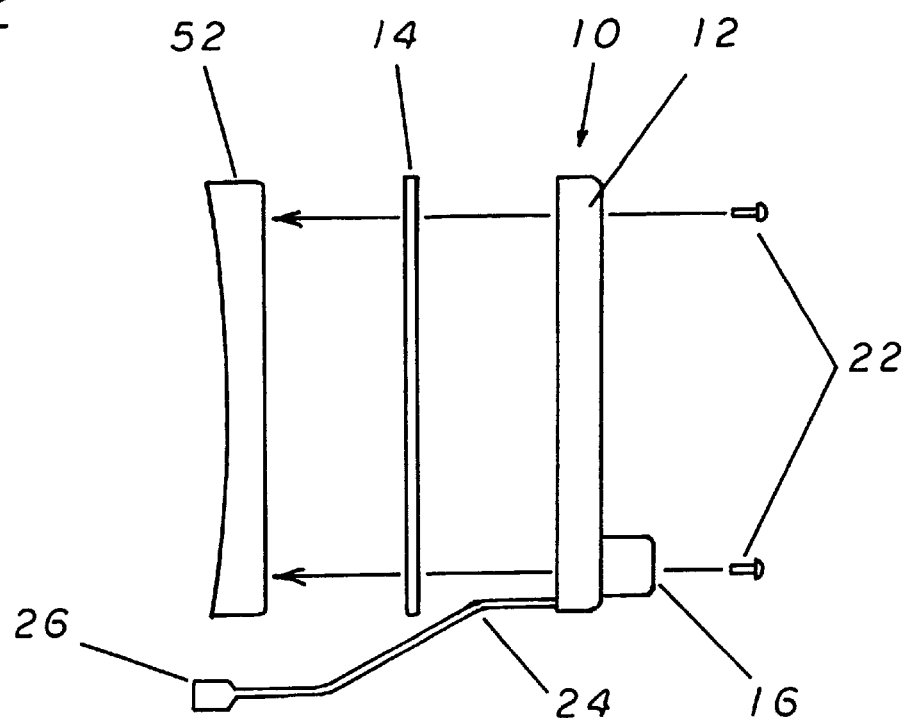
FIG. 2 is a side elevation view of the present invention showing the manner in which the frame attaches to the bumper and holds the license plate in place on the mounting portion of the vehicle.
Figure 3:
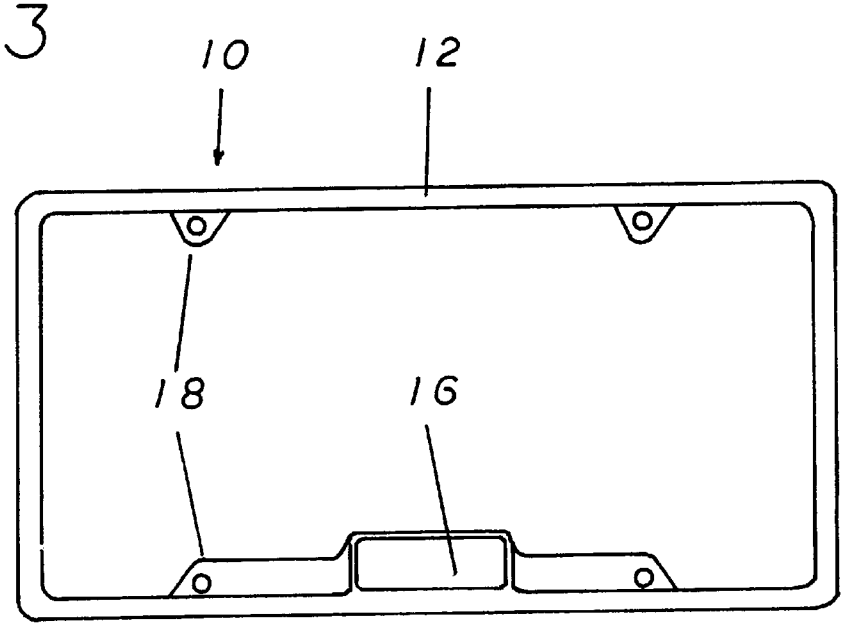
FIG. 3 is a front elevation view of the present invention showing the orientation of some of its major components in relation to one another.
Figure 4:
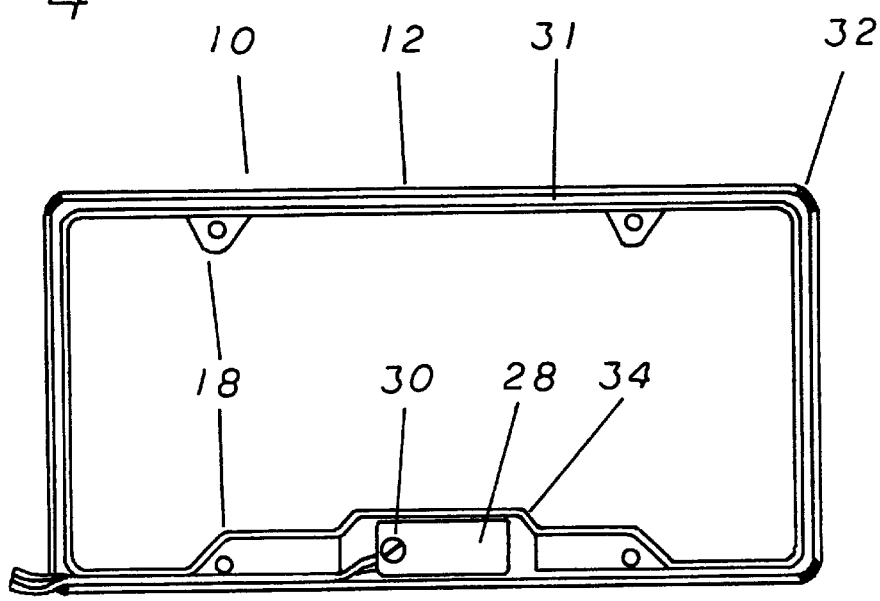
FIG. 4 is a rear elevation view of the present invention detailing the orientation of the remaining components and the manner in which the power cord is run along and out of the plate frame.

Referring now to the drawings, and more specifically to FIGS. 1, 2, 3 and 4, the license plate bracket with electrical attachment 10 is primarily made up of plate bracket 12 which is a rectangular frame apparatus with the outside dimension corresponding to that of a standard license plate 14. The inner surface of the plate bracket 12 is equipped with a plurality of inwardly facing plate attachment tabs 18, having a hole drilled through their center, and provide the points at which the present invention is fixed to the bumper 20 or another standard position on almost all of the vehicles on the road today.

The plate bracket 12 fits over the outwardly facing surface of the license plate 14 and serves to hold the license plate 14 between its inner surface and the plate base 52 which is in turn separately attached to the vehicle bumper 20. The attachment of the license plate 14 by use of the plate bracket 12 is made by passing the attachment screws 22 through the holes in the attachment tabs 18 which then pass through corresponding holes in the license plate 14 and into threaded holes in the base plate 52. This configuration serves to securely hold the license plate 14 on the vehicle's bumper 20.

The electrical attachment function of the present invention is facilitated by the use of the components within in the device housing 34 located at the center of the lower surface of the plate bracket 12 between the lower attachment tabs 18. The most prominent feature of device housing 34 of the present invention on the forward facing surface of the plate bracket 12 is the connector cover 16. The connector cover 16 is a pivotally mounted and spring loaded cap which serves to cover or expose (depending on the needs of the user) the electrical connectors located inside. The primary purpose of the connector cover 16 is to provide protection from the elements for the electrical connectors when they are not in use. It should be stated at this time that the mounting of the present invention may also be completed by rotating the inventions 180 degrees so that device housing 34 is on top.

The device housing 34 is a open chamber in the inwardly facing surface of the plate bracket 12 which serves as the primary mounting point for the electrical connectors. After they are installed, the electrical connectors are covered by the back cover 28. The back cover 28 is held in place by the use of the connection screw 30 which extends through the plate bracket 12 and into the connector cover 16 which it also holds in the proper position. The lead wire 24, from the electrical connector, protrudes from the back cover 28 from where it fits within the wire channel 31, which is a depression within the plate bracket 12. At each corner of the plate bracket 12 the wire channel 31 is equipped with a wire exit notch 32 which provides a point at which the lead wire 24 can exit the lead wire channel 31 to the outside of the plate bracket 12. The multiple wire exit notches 32 allow the user to employ the one that best fits his needs. From this point the lead wire 24 extends until it terminates at the female plug 26 which is fed back under the vehicle bumper 20, or other opening or route depending on the vehicle, to where it is attached to the plug of the electrical device that is fixed to the vehicle.

Figure 5:
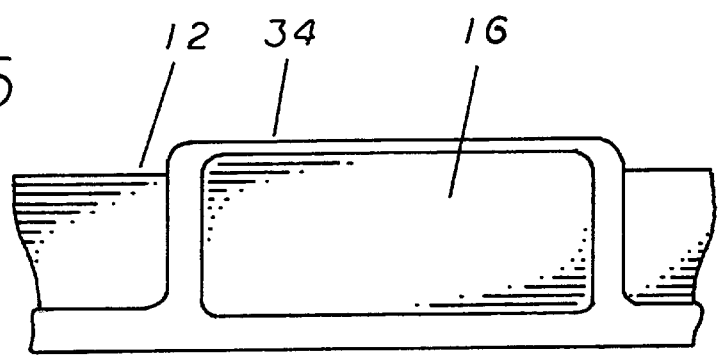
FIG. 5 is a front elevation view of the connection component of the present invention detailing its orientation when the cover is closed.
Figure 6:
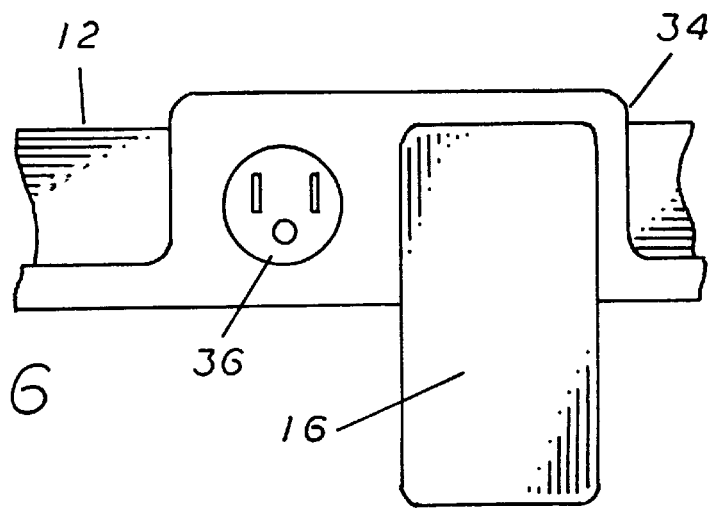
FIG. 6 is a front elevation view of the connection component of the present invention detailing its orientation when the cover is open and the male plug is exposed.
Figure 7:
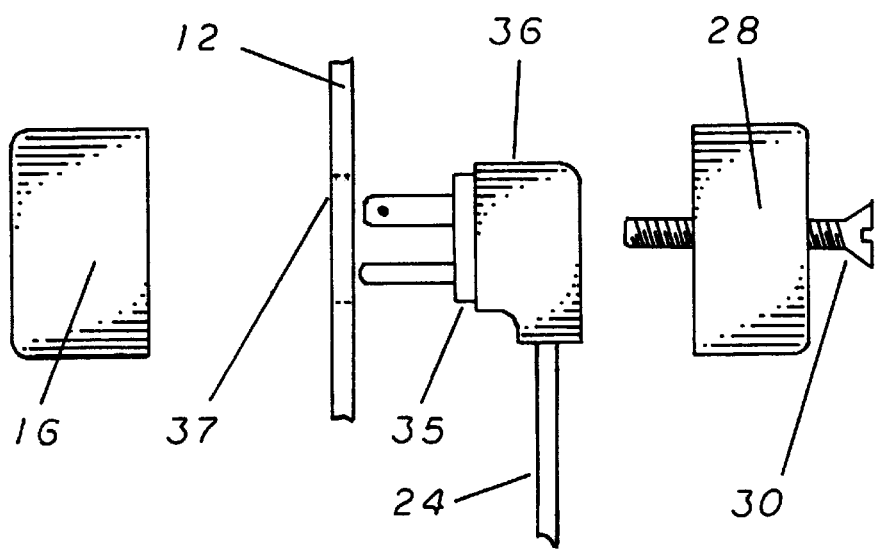
FIG. 7 is a side elevation exploded view of the connection component of the present invention showing the manner in which the male plug and cover are attached to the license plate frame.

The construction and manner of operation of the device housing 34 when used in conjunction with a male plug connector 36 and the manner of operation of the connector cover 16 are further illustrated in FIGS. 5, 6 and 7. As previously described, the connector cover 16 is a cap type apparatus that is pivotally attached to the forward facing surface of the plate bracket 12 on the device housing 34. When the present invention is not in use, the connector cover 16 is positioned so that it covers the male plug connector 36 (as illustrated in FIG. 5), thus, protecting the male plug connector 36 from exposure to the elements. Conversely, when the connector cover 16 is rotated by means of its pivotal attachment to the device housing 34 (as illustrated in FIG. 6), the male connector plug 36 is exposed which allows the user to connect it with an extension cord that is in turn connected to a power outlet. This method of construction not only protects the male plug connector 36 but also provides an easily accessible point of attachment for the extension cord necessary to provide electrical power to the device being used on the vehicle.

The attachment of the male plug connector 36 to the device housing 34, and therefore the plate bracket 12, is further illustrated in FIG. 7. The male plug connector 36 is fed through the plate bracket 12 from behind through the male plug hole 37 to a point where the male plug connector notch 35 (located at the leading edge of the body of the male plug 36) engages the male plug hole 37. The male plug connector notch 35 is of a diameter that fits snugly within the male plug hole 37 which aids in the positioning and attachment of the male plug connector 36. The attachment of the male plug 16 is primarily facilitated by the connector screw 30 which passes from the outside of the back cover 28 through the plate bracket 12 and into the connector cover 16. Thus, with this method of construction when the connection screw is tightened in encapsulates the male plug 36 within the connector cap and back cover 28 which holds the male plug connector 36 in the desired position on the plate bracket 12. This configuration allows the prongs of the male plug 36 to extend far enough beyond the outer surface of the plate bracket 12 to allow the user to easily connect an extension cord to the present invention.

Figure 8:
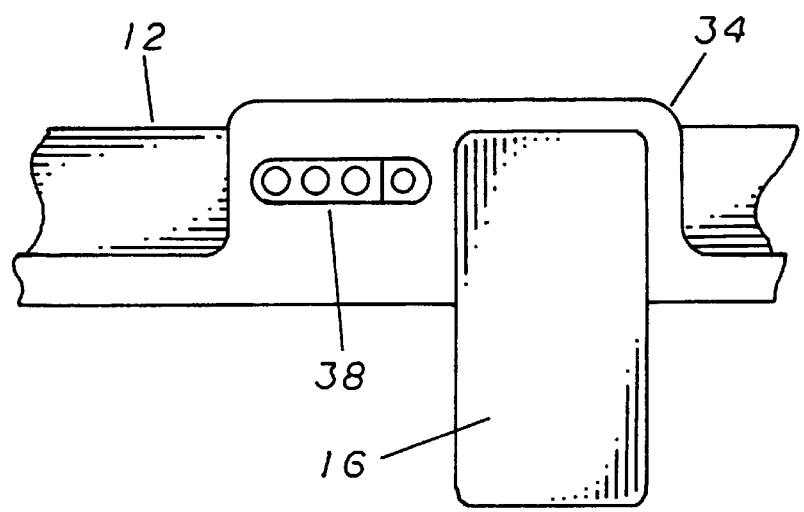
FIG. 8 is a front elevation view of the connection component of the present invention showing it as configured with an alternative connector typically used to hook up the lighting system of a trailer.
Figure 9:
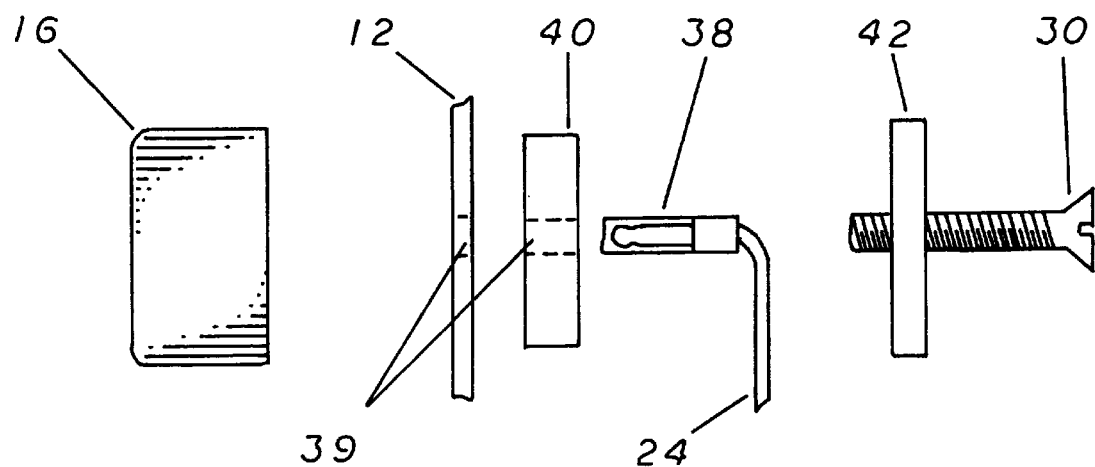
FIG. 9 is a side elevation exploded view of the connection component of the present invention showing it as used with a trailer connector and the manner in which the connector and rear connector cover are attached to the license plate frame.
Figure 10:
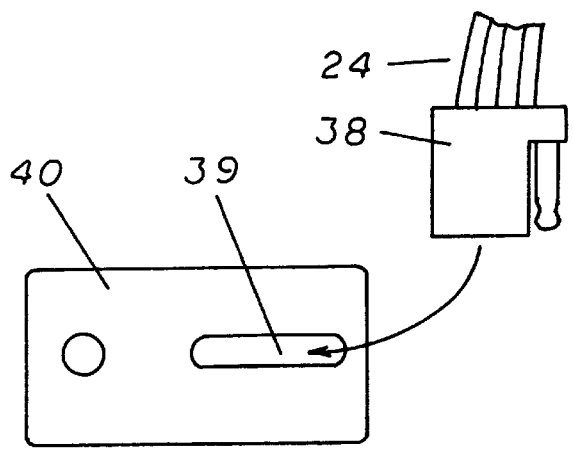
FIG. 10 is a front elevation view of the trailer connector housing and connector of the present invention showing the manner in which the connector fits into the housing to hold it in place within the invention.

The method of construction and manner of operation of the present invention when used in conjunction with a trailer wire harness connector 38 is illustrated in FIGS. 8, 9 and 10. The trailer wire connector 38 is attached to the plate bracket 12 by first inserting it into the trailer connector housing 40 through the connector hole 39 in a manner that the bulk of the trailer connector extends forward beyond the connector housing 40. This provides a base for anchoring the trailer connector 38 and it is then passed through an additional connector hole 39 in the plate bracket 12. Again, the attachment of the trailer connector 38 to the plate bracket 12 is primarily facilitated by the use of the connection screw 30 which passes through the trailer connector back cover 42 and eventually engages the connector cover 16 in much the same manner as with the male plug connector 36 as described above.

This configuration positions the trailer wire harness connector 38 in such a manner that it is easily accessible to the user when one desires to tow a trailer. To connect the wiring harness of the trailer to the towing vehicle one simply rotates the connector cover to expose the trailer connector 38 and then plugs the harness connector into the trailer connector 38 located on the plate bracket 12. Conversely, when there is no longer a need to tow the trailer, the user reverses the process and finishes by replacing the connector cover 16 over the trailer connector to ensure that it is protected from the weather conditions.

Figure 11:
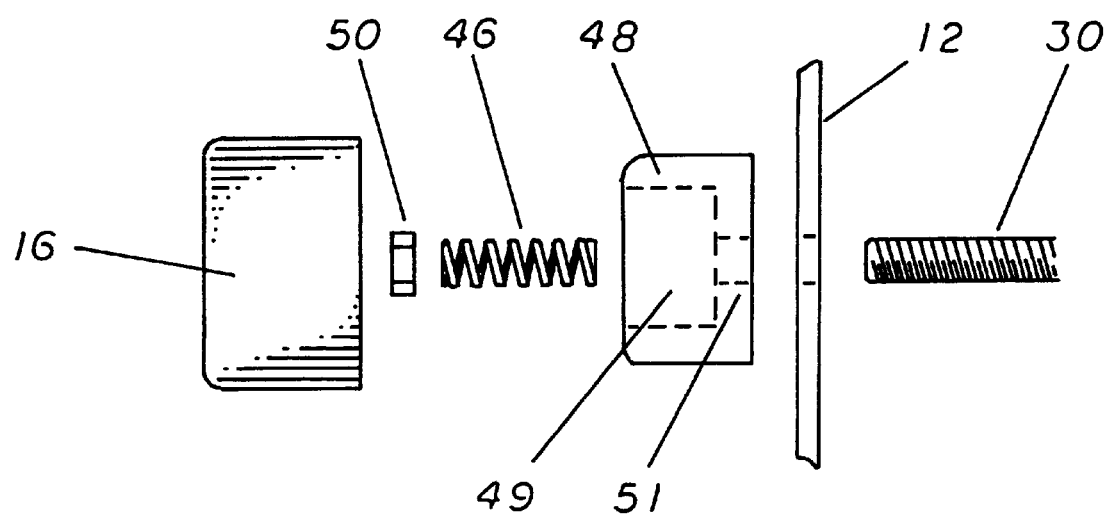
FIG. 11 is a side elevation exploded view of the connection component of the present invention showing the method by which the compression spring is held within the connector cover.

The workings of the pivotal and spring loaded attachment of the connector cover 16 are detailed by FIG. 11. As previously described, the primary component of the connection of the connector cover 16 to the plate bracket 12 is the connection screw 30 which passes into the connector cover 16 from the back cover 28 or the trailer connector back cover 42. The threaded attachment of the connection screw 30 to the connector cover 16 is facilitated by the use of the compression spring 46, the compression spring housing 48 and the compression spring nut 50 in conjunction with one another.

The compression spring housing 48 fits within and is mounted to one end of the connector cover 16 and is constructed in a manner such that it has an outwardly facing open spring cavity 49 which houses the compression spring 46. The compression spring housing 48 also has a smaller diameter connection screw hole 51 extending from its most inwardly facing surface to the spring cavity 49. This allows the connection screw 30 to pass through the spring housing 48 and into the spring cavity 49. In the spring cavity 49 the connection screw 30 passes through the center of the compression spring 46 and engages the compression spring nut 50 into which it is securely threaded. Since the compression spring housing 48 is attached to the connector cover 16 this secures the cover 16 to the face of the plate bracket 12, this connection also aids in reinforcing the cover 16 to prevent damage to the current invention. Additionally, the use of the compression spring 46 mounting system allows the connector cover to be pulled away from the surface of the plate bracket 12. This occurs because as outward pressure is placed on the connector cover 16 the compression spring 46 is compressed allowing the connector cover 16 to be pulled a pre-designed distance from the plate bracket 12. This design method is necessary to allow the connector cover 16 to be rotated because the male plug 36 and trailer connector 38 extends beyond the surface of the plate bracket 12, thus, it would be impossible to rotate the connector cover 16 unless it could be lifted to pass the plug connectors, 36 and 38.

Although the present invention has been described in considerable detail with reference to certain preferred versions thereof, other versions are possible. For example, the position of the male plug hole 37 and assemble may be varied in it's position on the current invention. Also, the types and styles of male plugs used can be varied greatly without changing the current invention. Therefore, the spirit and scope of the appended claims should not be limited to the description of the preferred versions contained herein.

What is claimed is:

1. A license plate bracket with an electrical attachment for a vehicle's accessory connection, said bracket comprising:
   a rectangular license plate bracket having a plug receptacle portion defining an accessory connector opening;
   an accessory connector fixedly attached within said accessory connector opening such that a connection may be made with said accessory connector within said accessory connector opening; and
   a moveable cover attached to said plug receptacle portion so as to cover said accessory connector opening and said accessory connector.

2. A license plate bracket as in claim 1 wherein said moveable cover further comprises a spring means to hold said cover in a biasedly closed position.

3. A license plate bracket as in claim 2 wherein said rectangular license plate bracket further defines a wire channel about said brackets outer edge.

4. A license plate bracket as in claim 3 further comprising an electrical cord having a first and second end with a male accessory connector at one end and a female accessory connector at the second end, said cord running from said plug receptacle portion through said wire channel and out of said rectangular license plate bracket.

5. A license plate bracket as in claim 4 wherein said male and female connectors are common three pronged a/c current connectors.

6. A license plate bracket as in claim 5 wherein said connectors are common vehicle trailer light and control connectors.

7. A license plate bracket for use in holding a license plate on the front or rear of a vehicle said vehicle having at least one electrical attachment for an accessory connection, said license plate bracket comprising:

a rectangular license plate bracket having a left and right edge and a top and bottom edge, with said top and bottom edge being longer than said left and right edge;

a wire channel defined by at least one of said edges of said license plate bracket;

a plug receptacle portion defining an accessory connector opening positioned on at least one edge of said license plate bracket;

a means of fixedly attaching an accessory connector in said accessory connector opening; and a moveable cover attached to said plug receptacle portion so as to cover said accessory connector opening.

8. A license plate bracket as in claim 7 wherein said moveable cover further comprises a spring means to hold said cover in a biasedly closed position.

9. A license plate bracket as in claim 8 further comprising an electrical cord having a first and second end with a male accessory connector at one end and a female accessory connector at the second end, said cord running from said plug receptacle portion through said wire channel and out of said rectangular license plate bracket.

10. A license plate bracket as in claim 9 wherein said plug receptacle is centered along one edge of rectangular license plate bracket.

11. A license plate bracket as in claim 9 wherein said plug receptacle is positioned between a left or right edge and a top or bottom edge of said rectangular license plate bracket.

12. A license plate bracket as in claim 9 wherein said male and female connectors are common three pronged a/c current connectors.

13. A license plate bracket as in claim 9 wherein said connectors are common vehicle trailer light and control connectors.

* * * * *